Feb. 27, 1951 E. KLEPPEN ET AL 2,543,501

FISH LURE

Filed Dec. 8, 1948

INVENTORS.
Emil Kleppen
Ingwald B. Hansen
BY Lancaster, Allwine & Rommel
ATTORNEYS.

Patented Feb. 27, 1951

2,543,501

UNITED STATES PATENT OFFICE 2,543,501

FISH LURE

Emil Kleppen and Ingwald B. Hansen,
Minneapolis, Minn.

Application December 8, 1948, Serial No. 64,154

3 Claims. (Cl. 43—35)

This invention relates to artificial bait or fish lures and it is one object of the invention to provide a lure which resembles a minnow used as lure for larger fish, the lure having a hollow body formed of companion side sections firmly secured together and enclosing hooks which move outwardly from retracted positions through slots to extended positions when pull is exerted upon pivoted end portions of the hooks by a fish taking the bait.

The present invention is an improvement in fish lures of the type shown in our Patent 2,474,481, granted June 28, 1949.

Another object of the invention is to provide an artificial bait wherein the hooks are pivotally mounted at opposite sides of a partition plate mounted in the body between the side sections thereof, the hooks thus prevented from catching against each other and failing to move to the extended position when pull is exerted upon their pivoted end portions.

Another object of the invention is to provide an artificial bait of this character in which the two side sections of the body and the partition plate have interlocking engagement with each other and are thus braced against movement out of their proper positions relative to each other.

Another object of the invention is to so mount the partition plate between the two side sections of the body, that a tight fit will be established between them.

Another object of the invention is to provide an artificial bait having hooks pivotally mounted for swinging movement, each hook being formed from a single strand of wire bent to form a hook having an arm extending from its pivoted end for connection with a yoke, by means of which pull is exerted upon the arms to swing the hooks to an extended position.

Another object of the invention is to provide an artificial bait which is of simple construction, very efficient in operation, and capable of being manufactured at a low cost.

The invention is illustrated in the accompanying drawings wherein.

Figure 1:
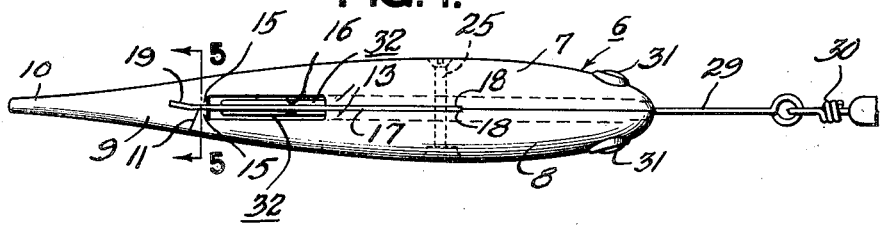
Fig. 1 is a top plan view of the improved artificial bait.

This improved artificial bait or fish lure has a hollow body 6 comprising an elongated main section 7 and a relatively shorter elongated side section 8, which are formed of metal, plastic, wood, or other suitable material and so shaped that the body has the shape of a small fish used as bait for catching larger fish which feed upon fish of the type simulated by the bait. The main side section 7 is formed adjacent its rear portion with a thickened portion 9 which includes a part of a tail simulation 10, at its rear end and at its front end, provides a forwardly facing shoulder 11 extending transversely of the section 7. The two side sections have their inner faces formed with cavities 12 which register and form a chamber within the body extending from its front end for the major portion of its length, the cavity being bordered by flanges 13 which meet in face to face engagement with each other and form an edge wall for the chamber. Back of their flanges 13 the main side section 7 and the companion auxiliary section 8 have flat surfaces 14 bordered by ribs or shoulders 15 extending transversely thereof and when the auxiliary section is applied to the main section the body is formed with a slot 16 open along the top and bottom of the body 6.

A plate 17, serving as a shield, fits between the two sections 7 and 8 and conforms in shape to the outline of the portions of the sections between which it fits so that its side edges are flush with the outer surface of the body. This plate is cut straight across its ends and has its front end bearing against shoulders 18 at front ends of recessed rear portions of the flanges 13, the recessed portions of the flanges being of such depth that the plate fits snugly between the flanges when the section 8 is applied to the section 7. The rear end portion of the plate fits tightly into a groove or slit 19 extending rearwardly of the zone of shoulder 11 of the section 7 and since this slit extends diagonally, as shown in Fig. 1, the rear end portion of the plate is frictionally gripped when it is fitted into the slit and its forward portion flexed into contact with the recessed portions of the flanges 13 by application of the section 8 to section 7. The rib 15 of the auxiliary side section is formed with a recess or groove 20 into which fits a lug 21 projecting forwardly from the shoulder 11 and at opposite sides of the lug the plate is punched, as shown at 22 to form lugs for fitting into sockets 23 formed in the rib of the main side section and also form sockets to receive lugs 24 projecting from the auxiliary side section. The lugs by fitting into the companion sockets or seats serve to prevent the rear end of the plate from shifting transversely out of the position shown in Fig. 2.

A screw 25, which is passed through an unthreaded opening formed in one side section and then passed through the forward end portion of the plate and engaged in a threaded opening formed in the other side section, firmly holds the two sections together but allows them to be easily taken apart when cleaning or repairs are necessary. Front ends of the two sections are held against transverse movement relative to each other by a lug 26, projecting from the flange 13 of the main section and engaged in a recess 27 formed in the flange of the auxiliary section. At their extreme front ends the two sections are formed with notches 28 which register and form an opening to accommodate a link or rod 29 attached at its outer or front end to a swivel 30 by means of which the bait is connected with a fishing line. Eye simulations 31 are provided at opposite sides of the front end of the body 6 to present a very realistic representation of a minnow or small fish used as bait.

Figure 2:
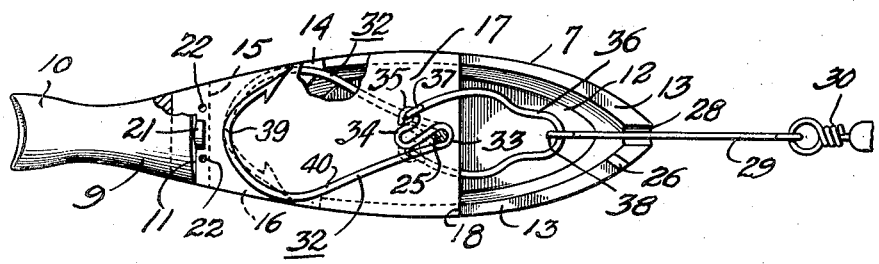
Fig. 2 is a view mainly in side elevation showing one side section of the body removed and some of the parts broken away to disclose details, the hooks being shown in retracted positions.
Figure 3:
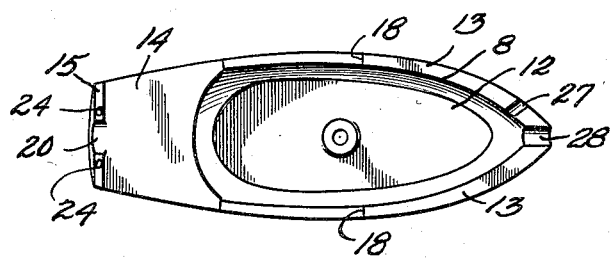
Fig. 3 is a view looking at the inner face of the side section removed from Fig. 2.
Figure 4:
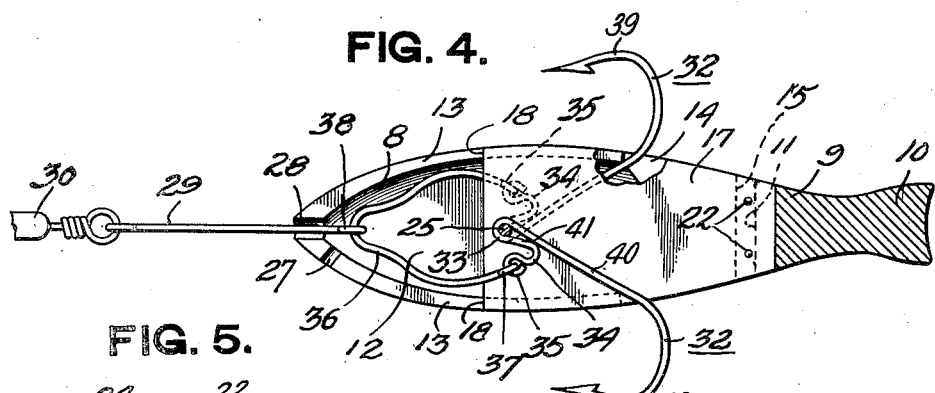
Fig. 4 is a view partly in side elevation and partly in vertical section, showing the hooks projecting from the body of the bait.
Figure 5:
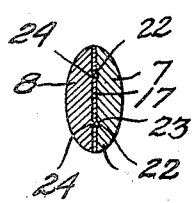
Fig. 5 is a transverse sectional view taken along the line 5—5 of Fig. 1.

In order to catch a fish taking the bait there are provided hook units 32 which extend longitudinally of the body and are movable through slot 16 from a retracted position within the body to an extended position. From an inspection of Figs. 2 and 4 it will be seen that when the hook units are retracted they are entirely within the body, whereas when they are extended they project from the body to such an extent that they will be embedded in a fish's mouth and project forwardly so that pull upon a fishing line will not dislodge the hook units and allow the fish to escape. The hook units are each preferably formed from a wire strand bent as shown in Figs. 2 and 4 for compactness. The hook units are located at opposite sides of the plate 17 so that their free barbed ends or hooks proper 39 cannot be caught against each other and prevent movement thereof to the extended position. The hook units are of duplicate construction and the forward end portion of the strand forming the hook proper 39 and a shank 40 is bent back upon itself to form an eye 33 through which the screw 25 passes to pivotally mount the hook. The rearwardly bent end portion 41 of the strand bears against the shank 40 and is then bent outwardly and forwardly to form an arm 34 terminating in an eye 35. As clearly shown in Figs. 2 and 4, the hook proper 39, shank 40, eye 33, arm 34 and eye 35 all lie in the same plane thus permitting compact positioning of the hook units in the chamber of the body 6, which may be made relatively slender even though accommodating the plate 17. A yoke 36 formed from a strand of resilient wire extends longitudinally of the body 6 in the body chamber. This yoke is substantially U-shaped and has rear portions of its arms bowed longitudinally with their rear ends in converging relation to each other and terminating in eyes 37 loosely engaged through the eyes 35 of the arms 34. An eye 38 at the rear end of the link or rod 29 loosely receives the bridge at the front end of the yoke, and when pull is exerted upon the rod the yoke will be drawn forwardly, and pull upon the arms 34 will swing the hooks to the extended position. Resiliency of the wire from which the yoke is formed causes the hooks to be returned to a retracted position when the bait is removed from the mouth of a caught fish and yieldably holds the hooks in the retracted position until the bait is again taken by a fish and pull exerted to swing the hooks outwardly to the extended position.

We claim:

1. A fish lure including a body comprising an elongated main section and a relatively shorter elongated auxiliary side section disposed against the inner side of the main section, said sections having their inner sides formed with cavities registering to form a chamber in the body extending from its front end for a major portion of its length, flanges extending along side edges of the cavities and across the front ends thereof and forming an edge wall for the chamber, a fastener passing transversely through the said sections and the chamber and removably securing the sections together, the rear portion of the main section being thickened and having a shoulder extending transversely thereof and engaged by the rear end of the auxiliary section, the thickened rear portion of the main section being formed with a slit extending rearwardly from the zone of its said shoulder and said sections having transversely extending ribs in front of the zone of said shoulder, said flanges having their rear ends spaced forwardly from the ribs and the inner faces of the portions of the sections between the flanges and the ribs being flat and unobstructed and forming a slot having open ends along the top and the bottom of the body between the said sections, a plate between said sections having side edge portions fitting between the flanges and its rear end portion extending between the ribs and into said slit, said fastener passing through the front end of the plate, a lug projecting from the shoulder of the main section and fitting into a recess formed in the rib of the auxiliary section, a lug projecting from the flange of one section near the front end thereof and fitting into a notch formed in the flange of the other section, the ribs and the rear end portion of the plate being formed with companion lugs and recesses into which the lugs fit at opposite sides of the lug projecting from the shoulder, hooks movable through the slot from normally retracted positions within the body at opposite sides of the plate to extended positions, each hook comprising a bill, a forwardly extending shank, an eye at the forward end of the shank through which the fastener passes to pivotally mount the hook, and an arm terminating in an eye extending from the shank adjacent said first mentioned eye, a substantially U-shaped yoke in the forward portion of said chamber formed from a strand of resilient wire and having a bridge at its front end and arms extending rearwardly therefrom and bowed longitudinally with their rear ends converging inwardly and terminating in eyes engaged with eyes of the arms of the hooks, and a rod passing through an opening at the front end of the body into the chamber and having an eye at its rear end through which the bridge of the yoke passes whereby a pull upon the rod will draw the yoke forwardly and swing the hooks outwardly to extended positions.

2. A fish lure including a body comprising an elongated main section and a relatively shorter elongated auxiliary side section, a fastener passing transversely through said sections and removably securing them together, said sections having inner faces formed with cavities registering and forming a chamber in the body through which the fastener passes, portions of the sections back of the cavities being spaced from each other and forming a slot open at the upper and lower portions of the body and communicating with the chamber, the main section having its rear portion formed with a forwardly facing shoulder engaged by the rear end of the auxiliary section and said main section provided with a slit extending rearwardly from the zone of said shoulder, and for at least a portion of its length extending at an incline transversely of the said main section, a plate constituting a partition for the slot and the rear portion of the chamber and having its rear end fitting into the inclined portion of the slit and its front end formed with an opening through which the fastener passes, the plate being clamped between the sections when the fastener is tightened, hooks extending longitudinally of the body at opposite sides of the plate and normally in retracted positions within the chamber and the slot, each hook comprising a bill, a forwardly extending shank, an eye at the forward portion of the shank through which the fastener passes pivotally mounting the hook and a laterally disposed arm terminating in an eye at the forward end of the shank, a yoke in forward portion of the chamber formed, from a strand of resilient wire and being substantially U-shaped and having a bridge at its front end and arms extending rearwardly therefrom, bowed longitudinally and terminating at their rear ends in eyes engaged through the eyes of the arms of said hooks, and a rod extending longitudinally of the body and slidably passing through an opening at the front end thereof into the chamber, and having its rear end connected with the bridge of the yoke whereby pull upon the rod will shift the yoke forwardly and swing the hooks to an extended position.

3. A fish lure comprising a body formed internally with a chamber and with a slot open at the top and bottom of the body, a pin passing through the chamber, hook units in said body each formed from a single strand of wire one portion of which is bent to form a hook proper and a shank extending therefrom and another portion of the strand being bent to form a loop providing an eye at the end of the shank, fitting about the pin to pivotally mount the hook, and an arm projecting from the loop, said hook proper, shank, loop and arm all lying in the same plane, a plate in said body disposed between the hook units and preventing contact of the hooks with each other, and a member slidable longitudinally in the chamber and connected with said arms for exerting pull and moving the hooks through the slots to extended positions when shifted forwardly.

EMIL KLEPPEN.
INGWALD B. HANSEN.

REFERENCES CITED

The following references are of record in the file of this patent:

UNITED STATES PATENTS

| Number | Name | Date |
|---|---|---|
| 1,173,694 | Witty | Feb. 29, 1916 |
| 1,670,174 | Wiersma | May 15, 1928 |
| 2,244,980 | Abramson | June 10, 1941 |
| 2,474,481 | Kleppen | June 28, 1949 |